June 4, 1963   E. E. STONEBROOK   3,092,744
ROTOR WINDING
Filed Feb. 23, 1960
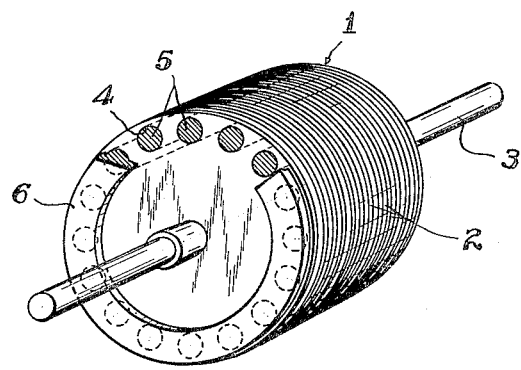
INVENTOR.
Edward E. Stonebrook
BY
ATTORNEY

3,092,744
ROTOR WINDING
Edward E. Stonebrook, Cleveland, Ohio, assignor to Aluminum Company of America, Pittsburgh, Pa., a corporation of Pennsylvania
Filed Feb. 23, 1960, Ser. No. 10,476
4 Claims. (Cl. 310—211)

This invention relates to an aluminum base alloy casting, and more particularly to the cast electrical winding composed of an aluminum base alloy in a motor rotor, such as rotors of the squirrel cage type.

The conventional rotor of an induction motor or like electrical product consists of a peripherally and axially slotted cylinder of laminated steel mounted on a rotor shaft. A suitable conductor is cast in the parallel slots or holes in the steel laminations and at the ends of the rotor, to form the winding and end rings. The composition of the rotor winding largely determines the operating characteristics of the motor.

Aluminum and aluminum base alloys, containing a low percentage of certain alloying elements to improve casting characteristics, have been extensively employed for certain types of cast rotor windings. Such aluminous metal combines a relatively high electrical conductivity with lightness which is important in the operating design of many rotors. Because the windings are formed by casting, usually die-casting, it is also important that the alloy possess desirable casting characteristics such as fluidity and substantial freedom from hot cracking. For these reasons, aluminum base alloys containing about 1 to 3% silicon, for example, have attained wide use in rotor applications.

However, certain induction motors require a high starting torque, such as one operating intermittently which, upon starting, must overcome a high load or high starting inertia and yet achieve maximum operating speed in a minimum time. The starting torque of the motor can be increased by increasing the electrical resistance of the rotor winding, and it is therefore necessary to employ in a motor of this type a rotor winding of relatively high electrical resistance, or conversely, of relatively low electrical conductivity. This invention has therefore as its principal object to provide a cast rotor winding composed of an aluminum base alloy for use in a motor rotor and characterized by a relatively low electrical conductivity.

Electrical conductivity as used herein and in the appended claims is expressed in terms of percent conductivity, on a volume basis, of the International Annealed Copper Standard (I.A.C.S.) where the pure annealed copper standard has an electrical resistance of 1.7241 michrohm-centimeter at 20° C. and is assigned a conductivity value of 100. The conductivity of aluminum on this basis is approximately 55 to 60% of that of copper, depending on its purity. There is a demand for rotor windings having a conductivity less than about 25% of I.A.C.S.

In accordance with the present invention the foregoing and other objects and advantages are attained to a particularly high degree in cast windings of an aluminum base alloy comprising, 14 to 20% silicon, 0.5 to 4% copper and 0.05 to 0.3% titanium, the balance aluminum and incidental impurities. Reference is had herein, and in the appended claims, to percent composition by weight. Cast rotor windings of an alloy of this composition are characterized by a low electrical conductivity of less than about 25% of I.A.C.S.

The above alloying elements within the stated ranges increase the resistivity of aluminum, and yield an alloy which in the cast condition has a low conductivity of less than about 25% of I.A.C.S., and may be as low as 20% of I.A.C.S. or even lower. If the content of these elements is less than the minimum amount, the cast alloy will not possess the desired resistivity suitable for use in high resistivity rotor windings.

My aluminum-copper-silicon-titanium alloys exhibit excellent casting properties which include, for example, high fluidity and feeding charactertistics as well as substantial freedom from hot cracking. Although an increase in silicon content will increase the resistivity of the cast rotor winding, employing amounts in excess of the above-defined limit for silicon, and for copper as well materially impairs the casting characteristics of the alloy. I have found, therefore, that for best results the content of the silicon should be about 15 to 17% by weight, and the copper content from about 2 to 3.5% by weight.

Employing titanium within the defined range of 0.05 to 0.3%, and preferably 0.1 to 0.3%, also has a decided influence on establishing a low conductive winding. Greater amounts than 0.3% titanium cause undesirable segregation of high-melting aluminum-titanium constituent, and hence it is unadvisable to exceed this concentration. Moreover, adding greater amounts than 0.3% titanium results in no apparent increase in electrical resistivity.

The usual incidental impurities found in aluminum of commercial grade may be included without any substantial detrimental effects. These impurities, such as iron, manganese, nickel, magnesium, zinc, or chromium, should not exceed a total of more than about 3% by weight. Any magnesium, nickel, maganese and chromium impurity should not be permitted in excess of about 0.5% for each element. The zinc impurity should not be more than about 1.5%. Die castings of the alloy may include as an impurity up to about 2% by weight iron as a result of absorption from the melting and holding pots. This element, however, aids in overcoming the tendency of the aluminum to adhere to the die or mold, commonly referred to as die soldering.

As examples of the invention, the table below shows electrical conductivity values of several permanent mold castings made under conditions simulating those where rotors are cast. Aluminum and impurities constitute the remainder of the alloy in each case.

*Composition and Electrical Conductivity of Castings*

| Percent Composition | | | | Electrical Conductivity, percent of I.A.C.S. |
| --- | --- | --- | --- | --- |
| Si | Cu | Ti | Fe | |
| 14 | 2 | 0.1 | 1 | 22.4 |
| 15.5 | 2 | 0.1 | 1 | 19.4 |
| 16.25 | 3.29 | 0.29 | 1.94 | 19.6 |
| 19 | 0.6 | 0.15 | ---- | 22 |

An embodiment of my invention is illustrated by the accompanying FIGURE showing a perspective view of a rotor with part of the end ring cut away to show the slots or holes of the rotor.

In the FIGURE, 1 represents in general a standard rotor consisting of a stack of laminations 2 carried on a rotor shaft 3. The laminations are provided near the periphery with parallel cylindrically shaped holes or slots 4 through which the aluminum alloy is cast forming the bars 5. The integrally cast rings 6 formed at the ends of the rotor together with the bars form the complete rotor winding, and hold the laminations together and in desired registration.

Having thus described my invention and certain embodiments thereof, I claim:

1. A motor rotor comprising a core and a cast aluminum base alloy winding consisting of 14 to 20% silicon, 0.5 to 4% copper, 0.05 to 0.3% titanium and the balance aluminum and impurities, said cast rotor winding being characterized by a low electrical conductivity of less than about 25% of I.A.C.S. on a volume basis and by substantial freedom from hot cracks.

2. A motor rotor comprising a core and a die cast aluminum base alloy winding consisting of 14 to 20% silicon, 0.5 to 4% copper, 0.05 to 0.3% titanium, and up to about 2% iron, the balance aluminum and impurities, said die cast rotor winding being characterized by a low electrical conductivity of less than about 25% of I.A.C.S. on a volume basis and by substantial freedom from hot cracks.

3. A motor rotor comprising a core and a cast aluminum base alloy winding consisting of 15 to 17% silicon, 2 to 3.5% copper and 0.1 to 0.3% titanium, and the balance aluminum and impurities, said cast rotor winding being characterized by a low electrical conductivity of less than about 25% of I.A.C.S. on a volume basis and by substantial freedom from hot cracks.

4. A motor rotor comprising a core and a die cast aluminum base alloy winding consisting of 15 to 17% silicon, 2 to 3.5% copper, 0.1 to 0.3% titanium, and up to about 2% iron, the balance aluminum and impurities, said die cast rotor winding characterized by a low electrical conductivity of less than about 25% of I.A.C.S. on a volume basis and by substantial freedom from hot cracks.

References Cited in the file of this patent

UNITED STATES PATENTS

| | | |
|---|---|---|
| 1,773,739 | McCollum | Aug. 26, 1930 |
| 1,950,197 | Taylor | Mar. 6, 1934 |
| 2,280,174 | Stroup | Apr. 21, 1942 |
| 2,357,451 | Bonsack | Sept. 5, 1944 |
| 2,392,802 | Anderson | Jan. 15, 1946 |